(12) United States Patent
Yeh et al.

(10) Patent No.: US 9,547,194 B2
(45) Date of Patent: Jan. 17, 2017

(54) LIQUID CRYSTAL DISPLAY APPARATUS

(71) Applicant: InnoLux Corporation, Miao-Li County (TW)

(72) Inventors: Jeng-Wei Yeh, Miao-Li County (TW); Shih-Chang Huang, Miao-Li County (TW); Kuei-Ling Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 291 days.

(21) Appl. No.: 13/941,018

(22) Filed: Jul. 12, 2013

(65) Prior Publication Data
US 2014/0028927 A1    Jan. 30, 2014

(30) Foreign Application Priority Data
Jul. 27, 2012  (TW) .............................. 101127117 A

(51) Int. Cl.
  *G02F 1/1335*  (2006.01)
(52) U.S. Cl.
  CPC ... *G02F 1/133603* (2013.01); *G02F 1/133514* (2013.01); *G02F 2001/133624* (2013.01)
(58) Field of Classification Search
  CPC ............ G02F 1/13338; G02F 1/133603; G02F 1/133514; G02F 2001/133624; G06F 3/0412
  USPC .......................................................... 349/12
  See application file for complete search history.

(56) References Cited

U.S. PATENT DOCUMENTS

| 2002/0060757 A1* | 5/2002 | Kiguchi et al. ................. 349/43 |
| 2006/0065900 A1* | 3/2006 | Hsieh et al. .................... 257/79 |
| 2007/0064179 A1* | 3/2007 | Park ................. G02F 1/136209 349/110 |
| 2008/0186433 A1 | 8/2008 | Haga et al. |
| 2009/0115714 A1* | 5/2009 | Jeong et al. .................... 345/88 |
| 2010/0188354 A1* | 7/2010 | Tamura ......................... 345/173 |

(Continued)

FOREIGN PATENT DOCUMENTS

| JP | 2011029304 A | 2/2011 |
| TW | 200710487 | 3/2007 |

(Continued)

*Primary Examiner* — Nathanel R Briggs
*Assistant Examiner* — William Peterson
(74) *Attorney, Agent, or Firm* — Muncy, Geissler, Olds & Lowe PC

(57) ABSTRACT

A liquid crystal display apparatus includes a display panel and a backlight module. The display panel includes a color filter layer having a blue filter portion. The backlight module emits light to the display panel. A peak wavelength of a blue light portion of the spectrum of the light is greater than or equal to 440 nm and smaller than or equal to 450 nm. The blue filter portion has a transmission spectrum having a first wavelength $\lambda 1$ and a second wavelength $\lambda 2$, and the first wavelength $\lambda 1$ and the second wavelength $\lambda 2$ conform to the following equation:

$$514 \leq \frac{\lambda_1}{2} + \frac{\lambda_2}{2} + 0.71862\, \lambda_2 - 0.71862\, \lambda_1 \leq 541$$

The first wavelength $\lambda 1$ and the second wavelength $\lambda 2$ are corresponding to a half level of a peak value of the transmission spectrum, and the unit thereof is nm.

6 Claims, 8 Drawing Sheets

(56) References Cited

U.S. PATENT DOCUMENTS

| | | | |
|---|---|---|---|
| 2010/0296024 A1* | 11/2010 | Ishimaru | G02B 5/20 349/61 |
| 2011/0176328 A1 | 7/2011 | Anandan et al. | |
| 2012/0062821 A1* | 3/2012 | Takeuchi et al. | 349/69 |
| 2014/0002507 A1* | 1/2014 | Ben-Chorin et al. | 345/690 |

FOREIGN PATENT DOCUMENTS

| | | |
|---|---|---|
| TW | 200925720 A | 6/2009 |
| TW | 201011388 A | 3/2010 |
| TW | 201213961 A1 | 4/2012 |

* cited by examiner

LIQUID CRYSTAL DISPLAY APPARATUS

CROSS REFERENCE TO RELATED APPLICATIONS

This Non-provisional application claims priority under 35 U.S.C. §119(a) on Patent Application No(s). 101127117 filed in Taiwan, Republic of China on Jul. 27, 2012, the entire contents of which are hereby incorporated by reference.

BACKGROUND OF THE INVENTION

1. Field of Invention

The invention relates to a display apparatus and, in particular, to a liquid crystal display apparatus.

2. Related Art

Liquid crystal display (LCD) apparatuses, having advantages such as low power consumption, less heat, light weight and less radiation, are widely applied to various electronic products and gradually take the place of cathode ray tube (CRT) display apparatuses.

In general, the LCD apparatus mainly includes an LCD panel, a backlight module, and a liquid crystal layer disposed in the LCD panel. The backlight module can emit light to the LCD panel, and thus the pixels of the LCD panel display various colors forming images. That the pixels can display various colors is mainly because of the deposition of a color filter layer in the LCD panel. Besides, the spectral pattern of the transmission spectrum of the color filter layer will affect the chromatic distribution (e.g. represented by x and y coordinates) of the light emitted by the LCD panel in the chromaticity diagram.

Therefore, it is an important subject of how to design a spectral pattern of the transmission spectrum of the color filter layer to allow the light emitted out of the display panel a better chromatic distribution in the chromaticity diagram so as to enhance the display quality and the product competitiveness.

SUMMARY

In view of the foregoing subject, an objective of the invention is to provide a liquid crystal display apparatus to allow the light emitted out of the display panel a better chromatic distribution in the chromaticity diagram.

To achieve the above objective, a liquid crystal display apparatus of the invention comprises a display panel and a backlight module. The display panel includes a color filter layer having a blue filter portion. The backlight module emits light to the display panel. The peak wavelength of a blue light portion of the spectrum of the light is greater than or equal to ($\geq$) 440 nm and smaller than or equal to ($\leq$) 450 nm, the blue filter portion has a transmission spectrum having a first wavelength $\lambda 1$ and a second wavelength $\lambda 2$, and the first wavelength $\lambda 1$ and the second wavelength $\lambda 2$ conform to the following equation:

$$514 \leq \frac{\lambda_1}{2} + \frac{\lambda_2}{2} + 0.71862\,\lambda_2 - 0.71862\,\lambda_1 \leq 541$$

The first wavelength $\lambda 1$ and the second wavelength $\lambda 2$ are corresponding to a half level of a peak value of the transmission spectrum, and the unit thereof is nm.

To achieve the above objective, a liquid crystal display apparatus of the invention comprises a display panel and a backlight module. The display panel includes a color filter layer having a blue filter portion. The backlight module emits light to the display panel. The peak wavelength of a blue light portion of the spectrum of the light is greater than or equal to ($\geq$) 450 nm and smaller than or equal to ($\leq$) 460 nm, the blue filter portion has a transmission spectrum having a first wavelength $\lambda 1$ and a second wavelength $\lambda 2$, and the first wavelength $\lambda 1$ and the second wavelength $\lambda 2$ conform to the following equation:

$$506 \leq \frac{\lambda_1}{2} + \frac{\lambda_2}{2} + 0.75655\,\lambda_2 - 0.75655\,\lambda_1 \leq 546$$

The first wavelength $\lambda 1$ and the second wavelength $\lambda 2$ are corresponding to a half level of a peak value of the transmission spectrum, and the unit thereof is nm.

In one embodiment, the display panel includes a first substrate, a second substrate, and a liquid crystal layer disposed between the first and second substrates, and the second substrate includes the color filter layer.

In one embodiment, the display panel includes a first substrate, a second substrate, and a liquid crystal layer disposed between the first and second substrates, and the first substrate includes a thin film transistor array and the color filter layer.

In one embodiment, the display panel includes a first substrate, a second substrate, and a liquid crystal layer disposed between the first and second substrates, the first substrate includes a thin film transistor array and a black matrix layer, and the second substrate includes the color filter layer.

In one embodiment, the display panel includes a first substrate, a second substrate, and a liquid crystal layer disposed between the first and second substrates, the first substrate includes a thin film transistor array, a black matrix layer, and the color filter layer.

In one embodiment, the liquid crystal display apparatus further comprises a touch panel. The display panel is disposed between the touch panel and the backlight module.

In one embodiment, the touch panel is of a strain gauge type, a resistive type, a capacitive type, an infrared type, a surface acoustic wave type, an electromagnetic type, or an optical imaging type.

In one embodiment, the touch panel includes a touch sensing circuit. The touch sensing circuit is of in-cell photo, in-cell capacitive, in-cell resistive or on-cell capacitive, and can be a multi-touch sensing circuit.

In one embodiment, the display panel further includes a first substrate and a second substrate opposite to each other, and the touch sensing circuit is disposed between the first and second substrates.

In one embodiment, the blue light portion of the light emitted out of the display panel has chromaticity with the x coordinate of 0.15±0.015 and the y coordinate of 0.06±0.015 in the CIE 1931 xy chromaticity diagram.

In one embodiment, the backlight module is of a direct type or a side-edge type.

In one embodiment, the light source of the backlight module includes a cold-cathode fluorescent lamp (CCFL), a light-emitting diode (LED), an organic light-emitting diode (OLED), or a quantum dot light source.

In one embodiment, the material of the active layer of a thin film transistor includes amorphous silicon, polysilicon, or indium gallium zinc oxide (IGZO).

In one embodiment, the backlight module includes red light-emitting diode, green light-emitting diode and blue light-emitting diode. Moreover, the backlight module can further include yellow light-emitting diode.

In one embodiment, the backlight module includes ultraviolet light-emitting diode and red, green and blue phosphors.

In one embodiment, the backlight module includes blue light-emitting diode and yellow phosphor. The yellow phosphor can have any kind of composition, such as YAG, YAG:Ce, BOSE, LuYAG, Nitride, or Silicate.

In one embodiment, the backlight module includes blue light-emitting diode and yellow and red phosphors.

In one embodiment, the backlight module includes blue light-emitting diode and green and red phosphors.

As mentioned above, the blue filter portion of the color filter layer of the liquid crystal display panel according to the invention is designed corresponding to the spectrum of the light emitted by the backlight module. When the peak wavelength of the blue light portion of the light spectrum of the backlight module is greater than or equal to (≥) 440 nm and smaller than or equal to (≤) 450 nm, the first and second wavelengths λ1 and λ2 (λ2>λ1) of the transmission spectrum of the blue filter portion corresponding to a half of the level of the peak value of the transmission spectrum conform to the following equation:

$$514 \le \frac{\lambda_1}{2} + \frac{\lambda_2}{2} + 0.71862\, \lambda_2 - 0.71862\, \lambda_1 \le 541$$

When the peak wavelength of the blue light portion of the light spectrum of the backlight module is greater than or equal to (≥) 450 nm and smaller than or equal to (≤) 460 nm, the first and second wavelengths λ1 and λ2 (λ2>λ1) of the transmission spectrum of the blue filter portion corresponding to a half of the level of the peak value of the transmission spectrum conform to the following equation:

$$506 \le \frac{\lambda_1}{2} + \frac{\lambda_2}{2} + 0.75655\, \lambda_2 - 0.75655\, \lambda_1 \le 546$$

By the above designs, the blue light portion of the light emitted out of the display panel has chromaticity with the x coordinate of 0.15±0.015 and the y coordinate of 0.06±0.015 in the CIE 1931 xy chromaticity diagram, i.e. a better chromatic distribution for enhancing the display quality. Besides, by the above designs, the blue filter portion can have better transmittance. Moreover, no matter what kind of the light source is, once the peak wavelength of the blue light portion of the light spectrum of the backlight module is greater than or equal to (≥) 440 nm and smaller than or equal to (≤) 450 nm, or greater than or equal to (≥) 450 nm and smaller than or equal to (≤) 460 nm, the invention can be applied thereto for increasing the selectivity of the light source and enhancing the display quality and the product competitiveness.

BRIEF DESCRIPTION OF THE DRAWINGS

The disclosure will become more fully understood from the detailed description and accompanying drawings, which are given for illustration only, and thus are not limitative of the present invention, and wherein.

DETAILED DESCRIPTION

The disclosure will be apparent from the following detailed description, which proceeds with reference to the accompanying drawings, wherein the same references relate to the same elements.

Figure 1:
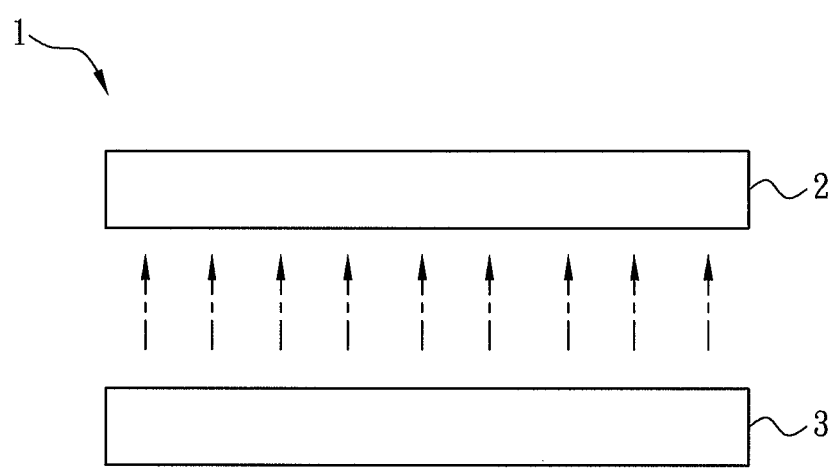
FIG. 1 is a schematic diagram of a liquid crystal display apparatus according to a preferred embodiment of the invention.

FIG. 1 is a schematic diagram of a liquid crystal display apparatus 1 according to a preferred embodiment of the invention. In FIG. 1, the liquid crystal display apparatus 1 includes a display panel 2 and a backlight module 3. The display panel 2 includes a color filter layer which has a blue filter portion. In general, the display panel 2 includes a first substrate and a second substrate which are opposite to each other, and a liquid crystal layer. As an embodiment, the first substrate is a thin film transistor (TFT) substrate, the second substrate is a color filter (CF) substrate, and the liquid crystal layer is disposed between the first and second substrates. In this case, the color filter layer is disposed on the color filter substrate, and includes the blue filter portion, a red filter portion, and a green filter portion. However, the invention is not limited thereto. For example, the color filter layer with its blue filter portion can be disposed on a side of the TFT array (i.e. color filter on array, COA), or the TFT array is disposed on the color filter substrate (i.e. TFT on CF, TOC, or array on CF).

The backlight module 3 can emit light to the display panel 2. The backlight module 3 in this embodiment is not limited in type, and can be a direct type or side-edge type backlight module. The light source of the backlight module 3 can include a cold-cathode fluorescent lamp (CCFL), a light-emitting diode (LED), an organic light-emitting diode (OLED), or a quantum dot light source, or any of combinations thereof. Herein, the light-emitting diode is used as the light source for example. In this embodiment, the backlight module 3 includes at least an LED (die or package), and emits white light. There are many ways to allow the backlight module 3 to emit white light. For example, white light can be generated by mixing the lights emitted by the red, green, and blue LEDs. The proportion of these LEDs is not limited here, and even the yellow LED can be added for the light mixing. Otherwise, when the ultraviolet LED cooperates with red, green and blue phosphors, white light can be generated by the ultraviolet emitted by the ultraviolet LED exciting these phosphors in company with the light mixing. Otherwise, white light can be generated by the blue LED and the yellow phosphor (the composition is not limited) together. The yellow phosphor, for example, contains YAG:Ce (cerium doped yttrium aluminum garnet) in the majority. However, the invention is not limited thereto. Otherwise, the blue LED also can cooperates with the yellow and red phosphors, or with the red and green phosphors, for generating white light. The aforementioned yttrium (Y) can be replaced by terbium (Tb) or gadolinium (Gd), and the aforementioned aluminum (Al) can be replaced by gallium (Ga). Moreover, when the quantum dot is used as the light source material of the backlight module 3, the quantum dot can be excited by ultraviolet or blue light for generating white light. The above examples are just for illustration, but not for limiting the scope of the invention.

Figure 2:
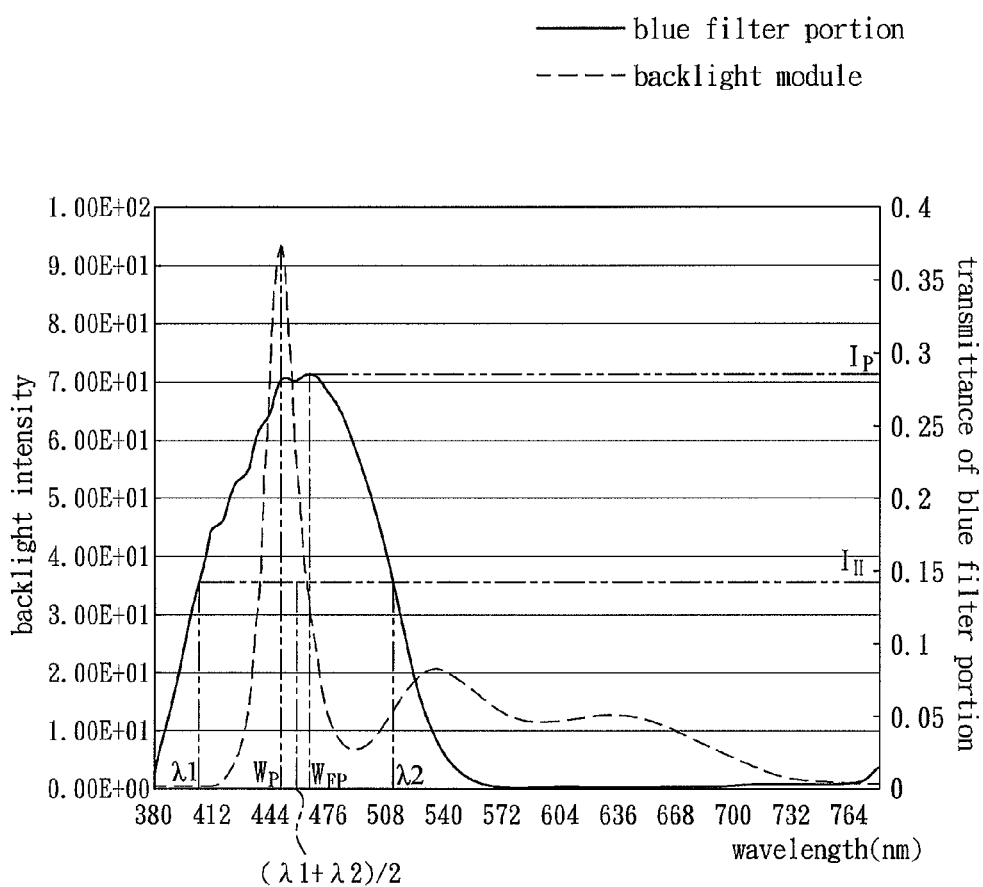
FIG. 2 is a schematic diagram of a spectrum of the light emitted by the backlight module and a transmission spectrum of the blue filter portion of the color filter layer according to a preferred embodiment of the invention.

FIG. 2 is a schematic diagram of a spectrum of the light emitted by the backlight module 3 and a transmission spectrum of the blue filter portion of the color filter layer. In FIG. 2, the light spectrum of the backlight module 3 is corresponding to the Y coordinate of the left side (i.e. backlight intensity), and the transmission spectrum of the blue filter portion is corresponding to the Y coordinate of the right side (i.e. transmittance of the blue filter portion). The aforementioned transmittance is a relative value understandably. As shown in FIG. 2, a peak wavelength $W_P$ of a blue light portion of the light spectrum of the backlight module 3 is greater than or equal to ($\geq$) 440 nm and smaller than or equal to ($\leq$) 450 nm. In this case, the transmission spectrum of the blue filter portion has a peak wavelength $W_{FP}$ having a level $I_P$, and a half of the level $I_P$ is corresponding to a first wavelength $\lambda 1$ and a second wavelength $\lambda 2$ ($\lambda 2 > \lambda 1$) of the transmission spectrum of the blue filter portion. The wavelengths $\lambda 1$ and $\lambda 2$ with the unit of "nm" conform to the following equation:

$$514 \leq \frac{\lambda_1}{2} + \frac{\lambda_2}{2} + 0.71862 \lambda_2 - 0.71862 \lambda_1 \leq 541$$

Moreover, similar to the embodiment shown in FIG. 2, when a blue light portion of the light spectrum of the backlight module 3 has a peak wavelength greater than or equal to ($\geq$) 450 nm and smaller than or equal to ($\leq$) 460 nm, the wavelengths $\lambda 1$ and $\lambda 2$ ($\lambda 2 > \lambda 1$) of the transmission spectrum of blue filter portion corresponding to a half of a level of a peak value of the transmission spectrum conform to the following equation:

$$506 \leq \frac{\lambda_1}{2} + \frac{\lambda_2}{2} + 0.75655 \lambda_2 - 0.75655 \lambda_1 \leq 546$$

Figure 3:
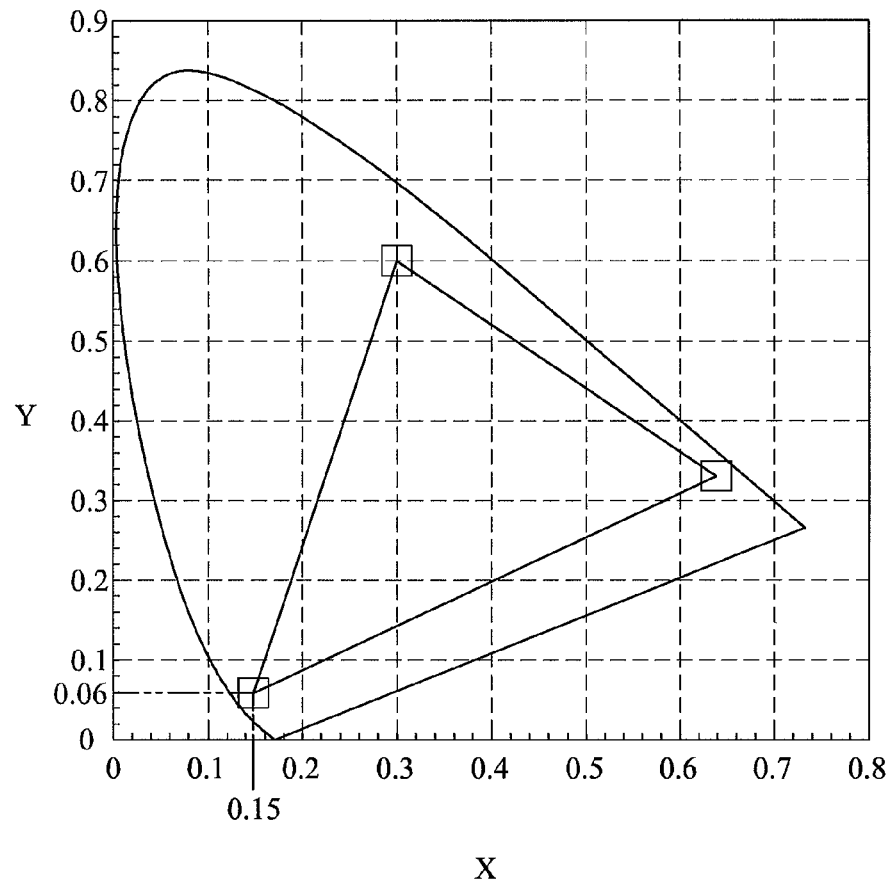
FIG. 3 is a schematic diagram showing the coordinate distribution of the blue light portion of the light emitted out of the liquid crystal display apparatus in the CIE 1931 xy chromaticity diagram.

By the above designs, the blue light emitted from the display panel can have better chromaticity. As shown in FIG. 3, the blue light portion of the light emitted out of the display panel 2 has chromaticity with the x coordinate of 0.15±0.015 and the y coordinate of 0.06±0.015 in the CIE 1931 xy chromaticity diagram, i.e. a better chromatic distribution for enhancing the display quality.

Figure 4:
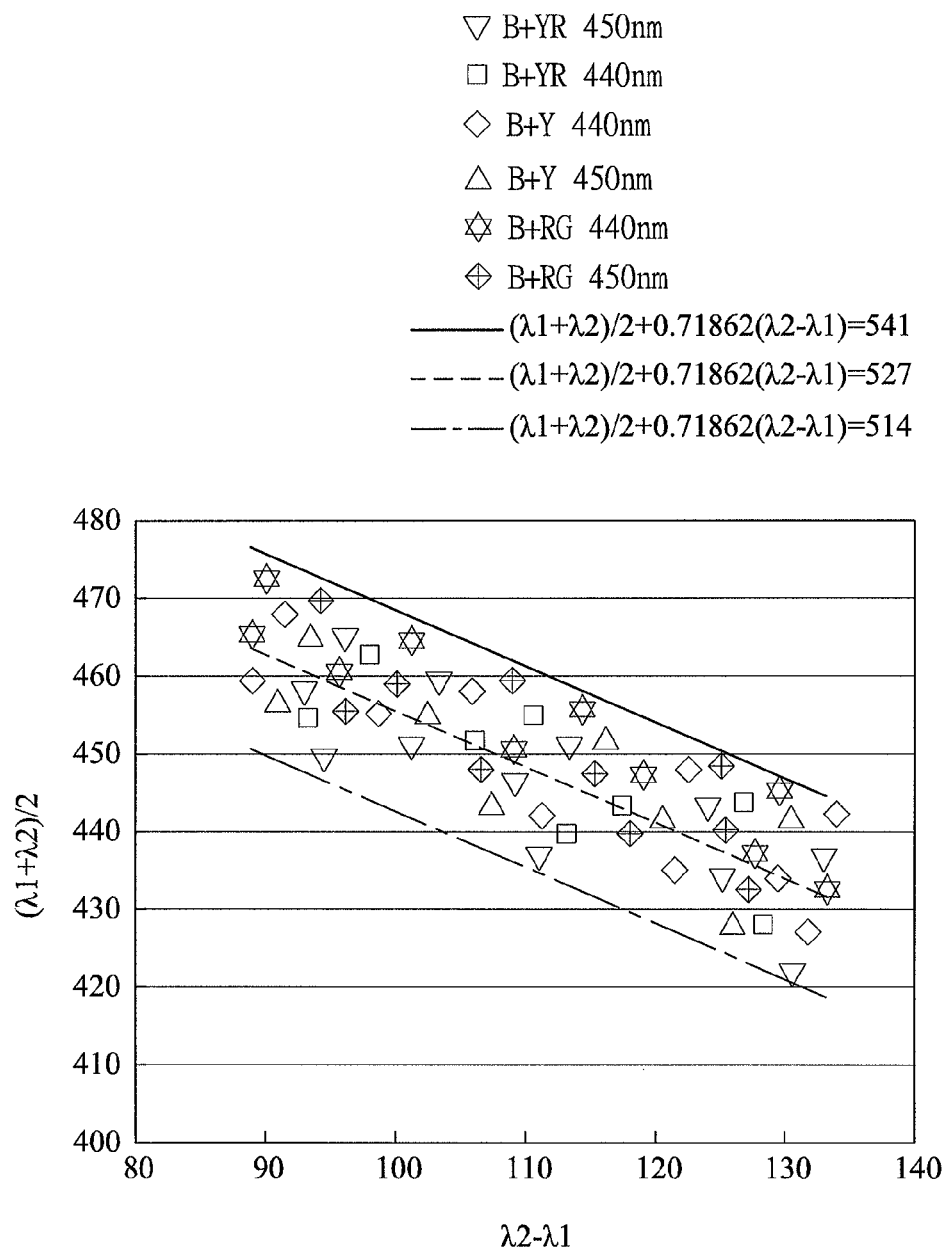
FIG. 4 is a schematic diagram showing the relation between the values of λ2−λ1 and λ1/2+λ2/2 under different light source designs when the peak wavelength of the blue light portion of the light spectrum of the backlight module is greater than or equal to 440 nm and smaller than or equal to 450 nm.

Besides, by the above designs, the blue filter portion can have better transmittance. Herein, the transmittance is defined as the light output amount of the display panel 2 divided by the light output amount of the backlight module 3. FIG. 4 is a schematic diagram showing the transmittances under different light source designs when the peak wavelength of the blue light portion of the light spectrum of the backlight module 3 is greater than or equal to ($\geq$) 440 nm and smaller than or equal to ($\leq$) 450 nm. In FIG. 4, the X coordinate represents a value of the wavelength $\lambda 2$ minus the wavelength $\lambda 1$, and the Y coordinate represents a value of ($\lambda 1 + \lambda 2$)/2. In FIG. 4, six different light source designs are illustrated wherein B represents blue LED, Y represents YAG phosphor, R represents red phosphor, and G represents green phosphor. To be noted, regarding the points in the figure, the more closer to the line represented by the equation $$"\frac{\lambda_1}{2} + \frac{\lambda_2}{2} + 0.71862 \lambda_2 - 0.71862 \lambda_1 \leq 541",$$

the higher the transmittances are. It is understandable that the light source design is not limited thereto.

Figure 5:
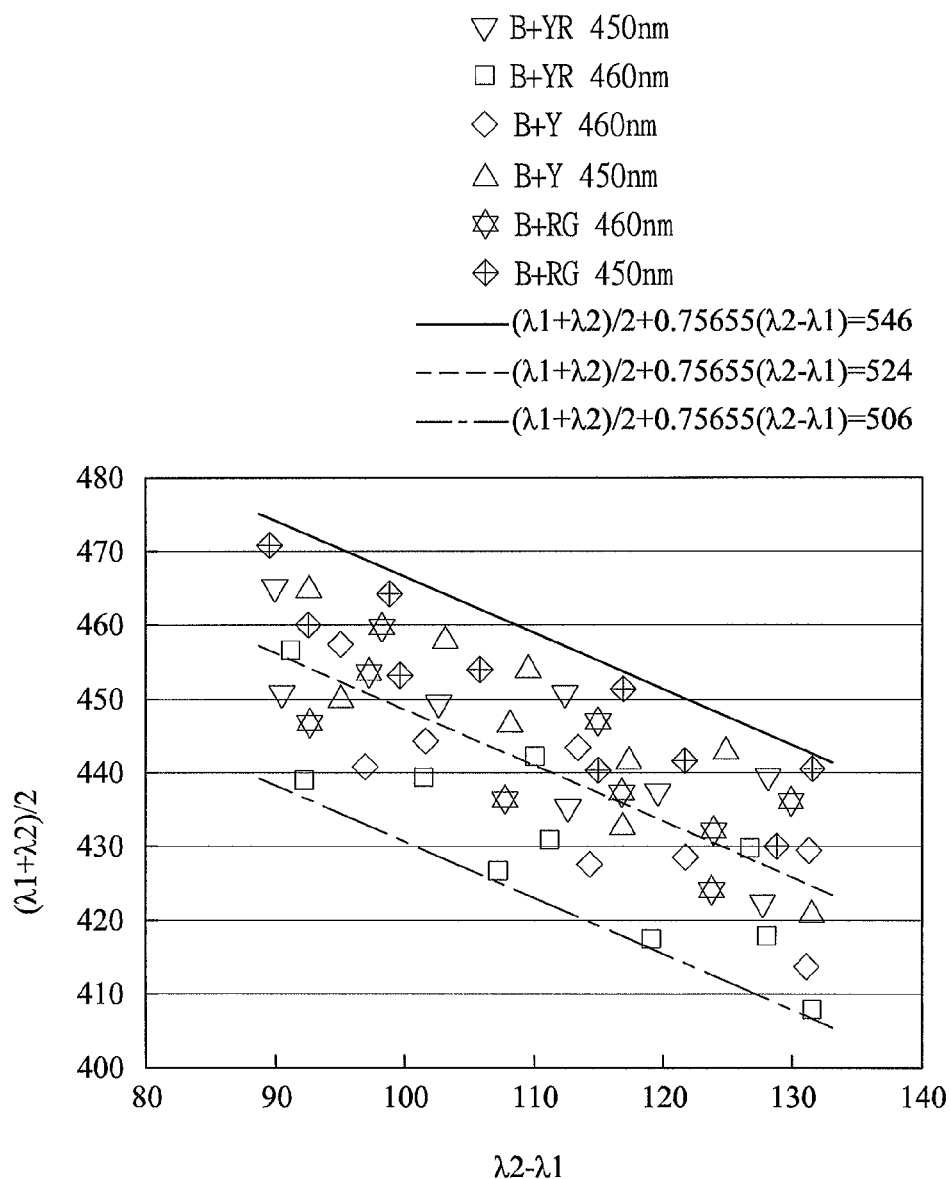
FIG. 5 is a schematic diagram showing the relation between the values of λ2−λ1 and λ1/2+λ2/2 under different light source designs when the peak wavelength of the blue light portion of the light spectrum of the backlight module is greater than or equal to 450 nm and smaller than or equal to 460 nm.

FIG. 5 is a schematic diagram showing the transmittances under different light source designs when the peak wavelength of the blue light portion of the light spectrum of the backlight module 3 is greater than or equal to ($\geq$) 450 nm and smaller than or equal to ($\leq$) 460 nm. Similar to FIG. 4, six different light source designs are illustrated in FIG. 5, and regarding the points in FIG. 5, the more closer to the line represented by the equation $$"\frac{\lambda_1}{2} + \frac{\lambda_2}{2} + 0.75655 \lambda_2 - 0.75655 \lambda_1 \leq 546"$$

the higher the transmittances are.

To be noted, when the peak wavelength of the blue light portion of the light spectrum of the backlight module 3 is equal to 450 nm, the above two designs concerning the blue filter portion can be both used.

In the invention, the color filter layer with the blue filter portion thereof can be disposed on the first substrate or second substrate of the display panel. Some illustrative varieties of the display panel are instanced as below.

Figure 6:
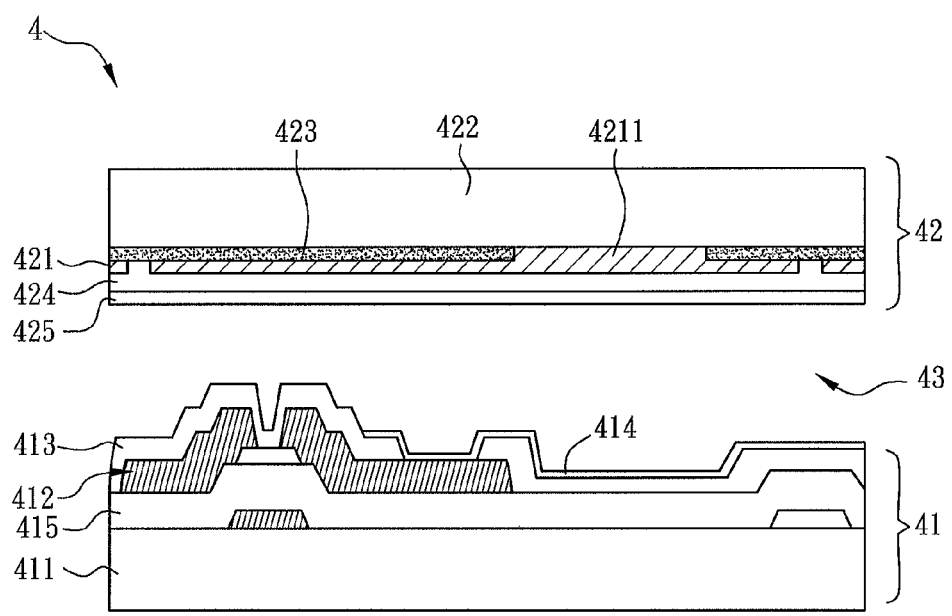
FIGS. 6 to 12 are schematic diagrams of varieties of the display panel according to a preferred embodiment of the invention.

In FIG. 6, a display panel 4 includes a first substrate 41, a second substrate 42, and a liquid crystal layer 43 disposed between the first and second substrates 41 and 42. The second substrate 42 includes a color filter layer 421 having a blue filter portion 4211. Of course, the color filter layer 421 can further include a red filter portion and a green filter portion. Besides, the color filter substrate 42 can further include a glass substrate 422, a black matrix (BM) layer 423, a passivation layer 424 and a common electrode layer 425. The common electrode layer 425 can be patterned or grooved. The first substrate 41 can include a glass substrate 411, a thin film transistor (TFT) array 412, a protection layer 413, a pixel electrode layer 414, and a gate insulting layer 415. The TFT array 412 includes a plurality of TFTs each having a gate, a source and a drain. Besides, the material of the active layer of the TFT can include amorphous silicon, polysilicon, or indium gallium zinc oxide (IGZO). When the active layer of the TFT is made of IGZO, the channel layer of the TFT can be coated with a etch stop layer (not shown). The first substrate 41 and the second substrate 42 further include a first polarizing element and a second polarizing element (not shown), respectively, and these polarizing elements can be, for example, polarizing plates or films.

Figure 7:
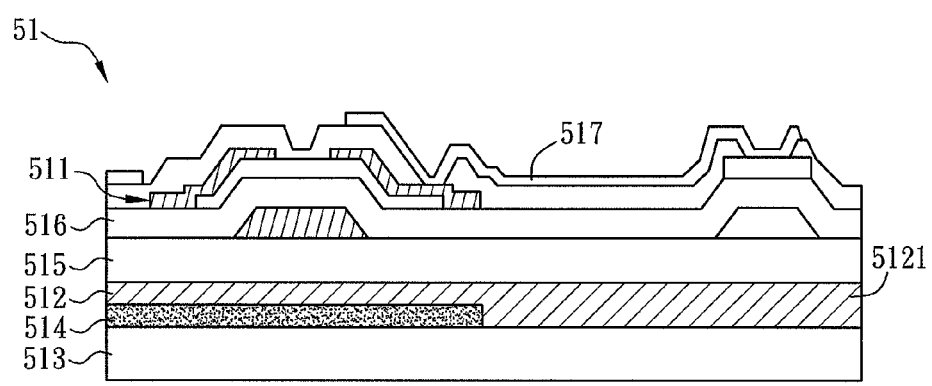

In FIG. 7, a display panel includes a first substrate, a second substrate, and a liquid crystal layer disposed between the first and second substrates. FIG. 7 only shows the first substrate 51 (can be an upper substrate or a lower substrate), which includes a TFT array 511 and a color filter layer 512. The color filter layer 512 includes a blue filter portion 5121, and can further include a red filter portion and a green filter portion. The first substrate 51 can further include a glass substrate 513, a black matrix layer 514, a buffer layer 515, a gate insulating layer 516, and a pixel electrode layer 517. In this embodiment, the color filter layer and the TFTs are disposed on the same substrate, and for example, the color filter layer is disposed on a side of the TFT array (i.e. color filter on array, COA), or the TFT array is disposed on the color filter substrate (i.e. TFT on CF, TOC, or array on CF), and the latter is carried out here. Thereby, the aperture ratio of the TFT and the brightness of the display panel can both be increased.

Figure 8:
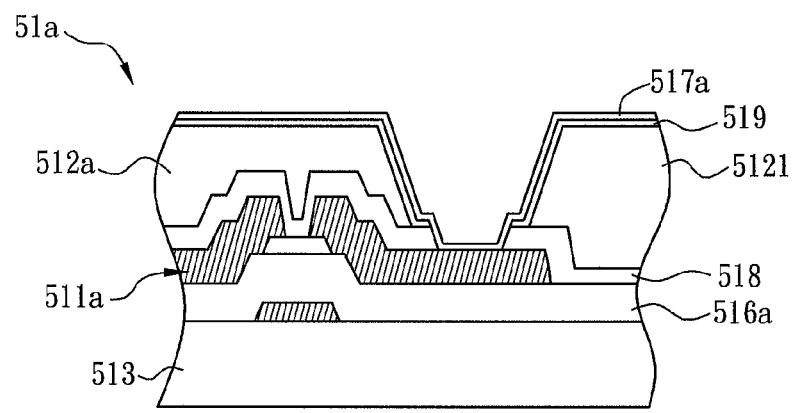

In FIG. 8, a color filter layer disposed on a side of a TFT array (color filter on array, COA) is shown up. In this case, a display panel includes a first substrate, a second substrate, and a liquid crystal layer disposed between the first and second substrates, and here only the first substrate 51a (a lower substrate) is shown. The first substrate 51a includes a TFT array 511a and a color filter layer 512a, which includes a blue filter portion 5121 and can further include a red filter portion and a green filter portion. The TFT array 511a and the color filter layer 512a are disposed on a glass substrate 513. The first substrate 51a further includes a gate insulating layer 516a, a pixel electrode layer 517a, a protection layer 518, and a capping layer 519. The pixel electrode layer 517a is electrically connected to the TFT array 511a.

Figure 9:
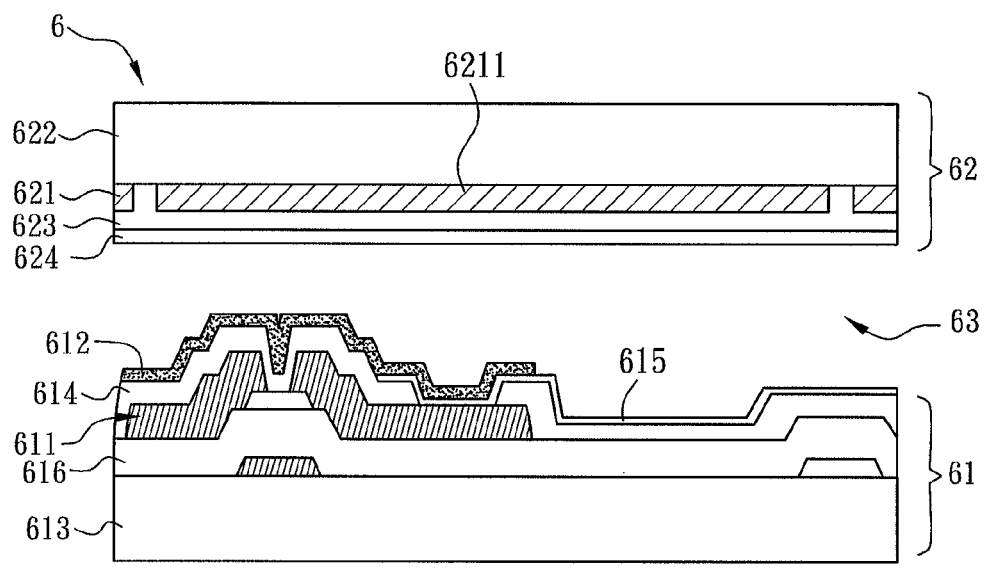

In FIG. 9, a display panel 6 includes a first substrate 61, a second substrate 62, and a liquid crystal layer 63 disposed between the first and second substrates 61 and 62. The first substrate 61 includes a TFT array 611 and a black matrix layer 612. The second substrate 62 includes a color filter layer 621, which includes a blue filter portion 6211 and can further include a red filter portion and a green filter portion. Besides, the first substrate 61 can further include a glass substrate 613, a protection layer 614, a pixel electrode layer 615, and a gate insulating layer 616. The second substrate 62 can further include a glass substrate 622, a passivation layer 623, and a common electrode layer 624. The common electrode layer 624 can be patterned or grooved. In this embodiment, the black matrix (BM) layer is disposed on a side of the TFT array (BM on array), and therefore the TFT array and the black matrix layer can be assured of a precise alignment precision therebetween.

Figure 10:
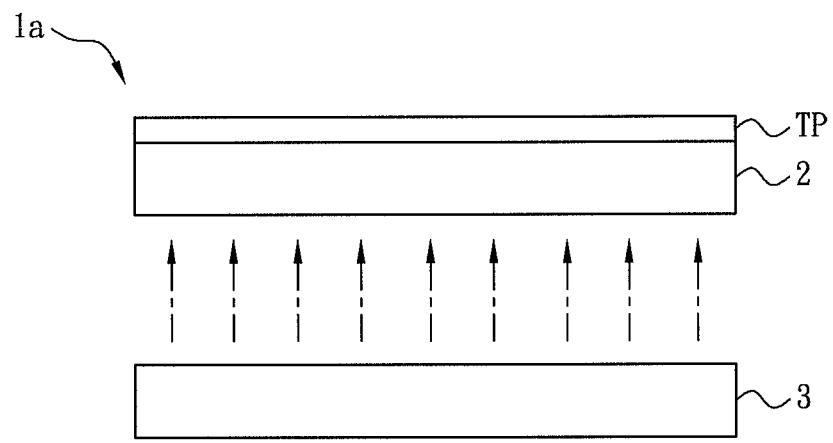

In FIG. 10, a liquid crystal display apparatus 1a further includes a touch panel TP. The touch panel TP is an out-cell type disposed on a side of the display panel 2, and the display panel 2 is thus located between the touch panel TP and the backlight module 3. The display panel 2 can be replaced by any display panel of all the above embodiments. The type of the touch panel TP is not limited in the invention, which can be, for example, a strain gauge type, a resistive type, a capacitive type, an infrared type, a surface acoustic wave type, an electromagnetic type, or an optical imaging type.

The touch control method can be carried out by a touch sensing circuit, using in-cell or on-cell touch control technology including in-cell photo, in-cell capacitive, in-cell resistive or on-cell capacitive, for example. The touch sensing circuit also can be a multi-touch sensing circuit.

Figure 11:
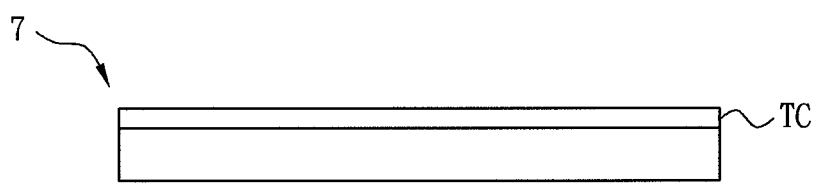
Figure 12:
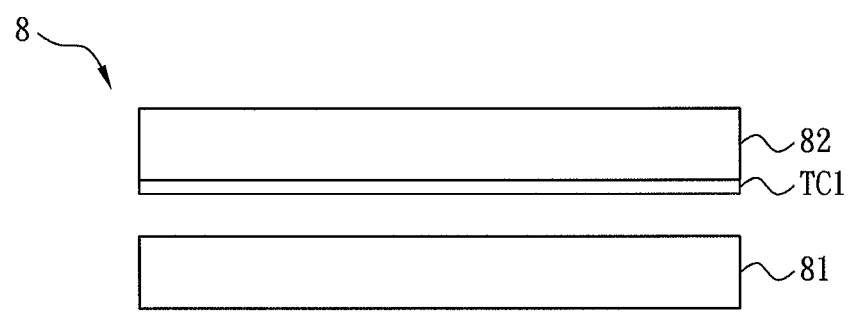

In FIG. 11, a display panel 7 includes a touch sensing circuit TC using on-cell touch control technology for example. In FIG. 12, a display panel 8 includes a touch sensing circuit TC1 using in-cell touch control technology for example. The display panel 8 further includes a first substrate 81 and a second substrate 82 opposite to each other, and the touch sensing circuit TC1 is disposed between the first and second substrates 81 and 82. The touch sensing circuit TC1 can be disposed on the first substrate 81 or the second substrate 82, and the latter option is carried out here.

In summary, the blue filter portion of the color filter layer of the liquid crystal display panel according to the invention is designed corresponding to the spectrum of the light emitted by the backlight module. When the peak wavelength of the blue light portion of the light spectrum of the backlight module is greater than or equal to (≥) 440 nm and smaller than or equal to (≤) 450 nm, the wavelengths λ1 and λ2 (λ2>λ1) of the transmission spectrum of the blue filter portion corresponding to a half of the level of the peak value of the transmission spectrum conform to the following equation:

$$514 \le \frac{\lambda_1}{2} + \frac{\lambda_2}{2} + 0.71862\,\lambda_2 - 0.71862\,\lambda_1 \le 541$$

When the peak wavelength of the blue light portion of the light spectrum of the backlight module is greater than or equal to (≥) 450 nm and smaller than or equal to (≤) 460 nm, the wavelengths λ1 and λ2 (λ2>λ1) of the transmission spectrum of the blue filter portion corresponding to a half of the level of the peak value of the transmission spectrum conform to the following equation:

$$506 \le \frac{\lambda_1}{2} + \frac{\lambda_2}{2} + 0.75655\,\lambda_2 - 0.75655\,\lambda_1 \le 546$$

By the above designs, the blue light portion of the light emitted out of the display panel has chromaticity with the x coordinate of 0.15±0.015 and the y coordinate of 0.06±0.015 in the CIE 1931 xy chromaticity diagram, i.e. a better chromatic distribution for enhancing the display quality. Besides, by the above designs, the blue filter portion can have better transmittance. Moreover, no matter what kind of the light source is, once the peak wavelength of the blue light portion of the light spectrum of the backlight module is greater than or equal to (≥) 440 nm and smaller than or equal to (≤) 450 nm, or greater than or equal to (≥) 450 nm and smaller than or equal to (≤) 460 nm, the invention can be applied thereto for increasing the selectivity of the light source and enhancing the display quality and the product competitiveness.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:
1. A liquid crystal display apparatus, comprising:
a display panel, comprising:

a first substrate, a second substrate, and a liquid crystal layer disposed between the first substrate and the second substrate;

a color filter layer disposed on the first substrate or on the second substrate, and the color filter layer having a blue filter portion;

a black matrix layer disposed on the first substrate;

a thin film transistor disposed on the first substrate and comprising a gate; and a pixel electrode disposed on the thin film transistor and electrically connecting to the thin film transistor through a via hole, wherein the black matrix layer overlaps the thin film transistor, a portion of the black matrix is disposed in the via hole, and a distance from the substrate to an upper surface of the black matrix layer above the gate is different from a distance from the substrate to the upper surface of the black matrix layer above the via hole; and a backlight module emitting light to the display panel, wherein a first peak wavelength of a blue light portion of the spectrum of the light emitted by the backlight module is greater than or equal to 440 nm and smaller than or equal to 450 nm, wherein the blue filter portion has a transmission spectrum having a first wavelength $\lambda 1$ and a second wavelength $\lambda 2$, and the first wavelength $\lambda 1$ and the second wavelength $\lambda 2$ conform to the following equation:

$$514 \leq \frac{\lambda_1}{2} + \frac{\lambda_2}{2} + 0.71862\, \lambda_2 - 0.71862\, \lambda_1 \leq 541,$$

wherein the first wavelength $\lambda 1$ and the second wavelength $\lambda 2$ are corresponding to a half level of a peak value of the transmission spectrum, and the unit thereof is nm, wherein a second peak wavelength of the spectrum of the light emitted by the backlight module is larger than the first wavelength and the second wavelength, and the second peak wavelength of the spectrum of the light emitted by the backlight module is smaller than 600 nm, wherein an intensity of the light emitted by the backlight module with a wavelength larger than or equal to the 600 nm is smaller than an intensity of the second peak wavelength.

2. The liquid crystal display apparatus as recited in claim 1, further comprising:

a touch panel, wherein the display panel is disposed between the touch panel and the backlight module.

3. The liquid crystal display apparatus as recited in claim 1, wherein the display panel includes a touch sensing circuit.

4. The liquid crystal display apparatus as recited in claim 1, wherein the blue light portion of the light emitted out of the display panel has chromaticity with the x coordinate of 0.15±0.015 and the y coordinate of 0.06±0.015 in the CIE 1931 xy chromaticity diagram.

5. The liquid crystal display apparatus as recited in claim 1, wherein the material of the active layer of the thin film transistor includes amorphous silicon, polysilicon, or indium gallium zinc oxide (IGZO).

6. The liquid crystal display apparatus as recited in claim 1, wherein the backlight module includes blue light-emitting diode and yellow phosphor, or blue light-emitting diode and green and red phosphors.

* * * * *